United States Patent
Oyman et al.

(10) Patent No.: US 8,675,577 B2
(45) Date of Patent: Mar. 18, 2014

(54) SIGNALING TECHNIQUES FOR A MULTIMEDIA-AWARE RADIO AND NETWORK ADAPTATION

(75) Inventors: Ozgur Oyman, San Jose, CA (US); Jeffrey R. Foerster, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 495 days.

(21) Appl. No.: 12/973,412

(22) Filed: Dec. 20, 2010

(65) Prior Publication Data

US 2012/0155398 A1    Jun. 21, 2012

(51) Int. Cl.
 *H04J 3/16* (2006.01)
(52) U.S. Cl.
 USPC ............ 370/329; 370/465; 370/464; 370/467
(58) Field of Classification Search
 USPC ......... 370/229, 232, 236, 259, 277, 278, 282; 375/240–241
 See application file for complete search history.

(56) References Cited

U.S. PATENT DOCUMENTS

| | | | | |
|---|---|---|---|---|
| 6,999,432 B2 * | 2/2006 | Zhang et al. | | 370/328 |
| 7,003,042 B2 * | 2/2006 | Morelos-Zaragoza et al. | | 375/253 |
| 7,096,034 B2 * | 8/2006 | Zhang et al. | | 455/522 |
| 7,609,652 B2 * | 10/2009 | Kellerer et al. | | 370/252 |
| 7,656,815 B2 * | 2/2010 | Kellerer et al. | | 370/252 |
| 7,668,191 B2 * | 2/2010 | Steinback et al. | | 370/437 |
| 2004/0057383 A1 * | 3/2004 | Tseng et al. | | 370/252 |
| 2009/0122756 A1 * | 5/2009 | Gu et al. | | 370/329 |
| 2010/0029266 A1 * | 2/2010 | van Gassel et al. | | 455/424 |
| 2010/0157814 A1 * | 6/2010 | Ha et al. | | 370/242 |
| 2010/0226262 A1 * | 9/2010 | Liu et al. | | 370/252 |
| 2010/0296428 A1 * | 11/2010 | Ho | | 370/312 |
| 2010/0315561 A1 * | 12/2010 | Cooper et al. | | 348/726 |
| 2011/0063991 A1 * | 3/2011 | Sampath et al. | | 370/252 |
| 2012/0155398 A1 * | 6/2012 | Oyman et al. | | 370/329 |

FOREIGN PATENT DOCUMENTS

WO    2009128755    10/2009
WO    WO 2009128755 A1 *    10/2009

OTHER PUBLICATIONS

Fotis Foukalas, et al., Cross-Layer Design Proposals for Wireless Mobile Networks: A survey and Taxonomy, 1st Quarter 2008, IEEE Communications Surveys, vol. 10, No. 1, pp. 70-85.*

Ozgar Oyman, et al., Toward Enhanced Mobile Video Services over WiMAX and LTE, Aug. 2010, IEEE Communications Magazine, pp. 68-76.*

Foukalas, et al., Cross-Layer Design Proposals for Wireless Mobile Newtorks: A Survey and Taxonomy, 1st Quarter 2008, IEEE Communications Surveys, vol. 10, No. 1, pp. 70-85.*

(Continued)

*Primary Examiner* — Hassan Kizou
*Assistant Examiner* — Phyllis Book
(74) *Attorney, Agent, or Firm* — Kacvinsky Daisak Bluni PLLC

(57) ABSTRACT

An approach to enhance quality of experience (QoE) in a wireless multimedia communication system is disclosed. A signaling mechanism is provided to make application-layer parameters of a multimedia application to be accessible in one or more network interfaces including an air interface, an access network interface, and a core network interface. Also, the application-layer parameters may be included in quality of service (QoS) class definitions to make the application-layer parameters accessible at the one or more network interfaces. The signaling mechanism and inclusion of application-layer parameters into the QoS class definitions is to enable the QoE-aware link adaptation, resource allocation, joint source channel coding based cross-layer optimizations.

14 Claims, 6 Drawing Sheets

(56) References Cited

OTHER PUBLICATIONS

International Search Report and Written Opinion for PCT Patent Application No. PCT/US2011/063322, mailed Jul. 25, 2012, 9 pgs.

Oyman et al., "Toward Enhanced Mobile Video Services Over WiMAX and LTE": IEEE Communications Magazine, vol. 48, Issue 6, pp. 68-76, Aug. 2010.

\* cited by examiner

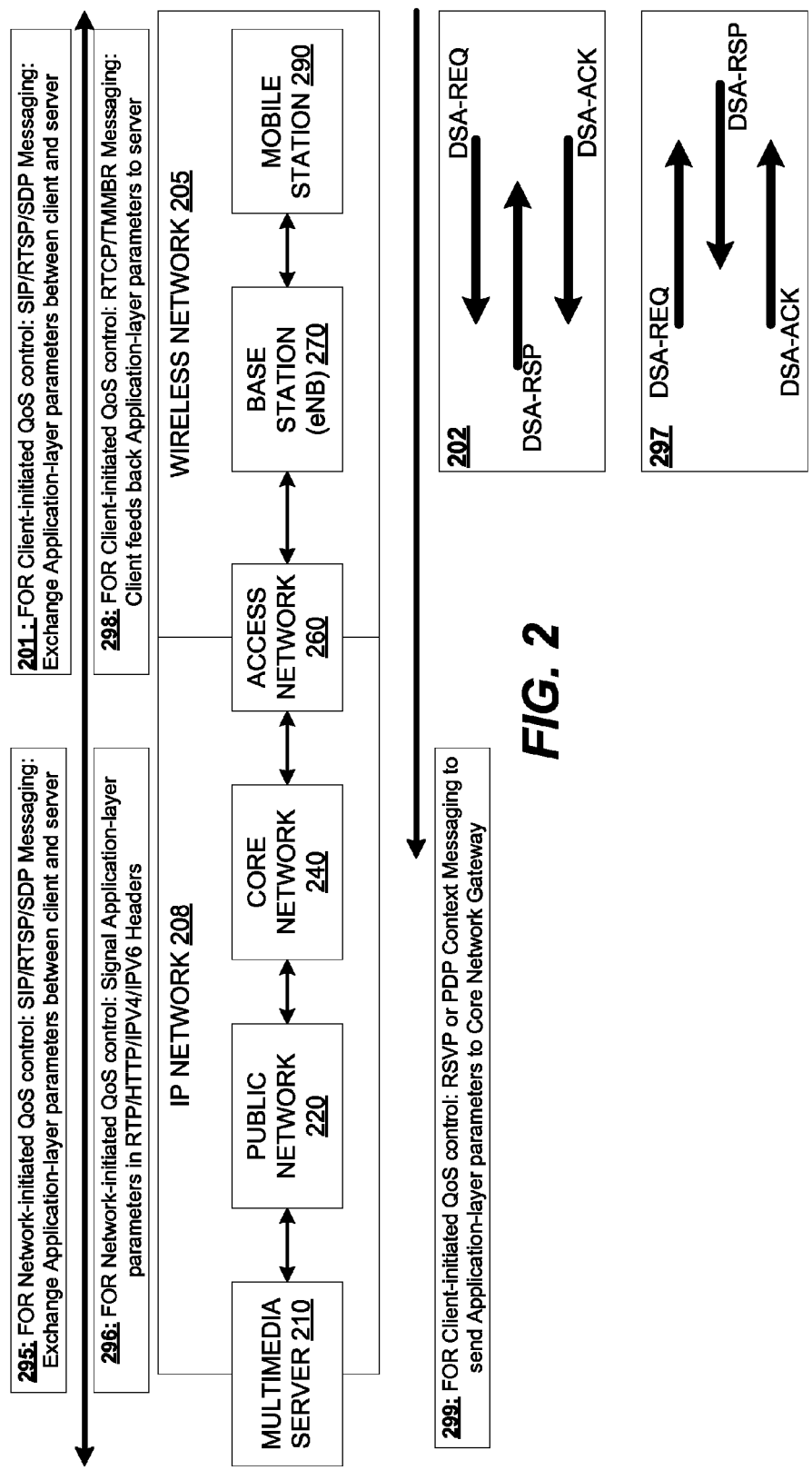

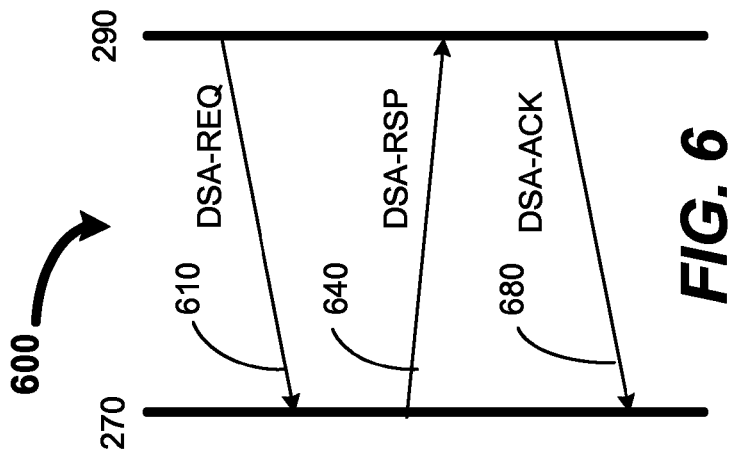
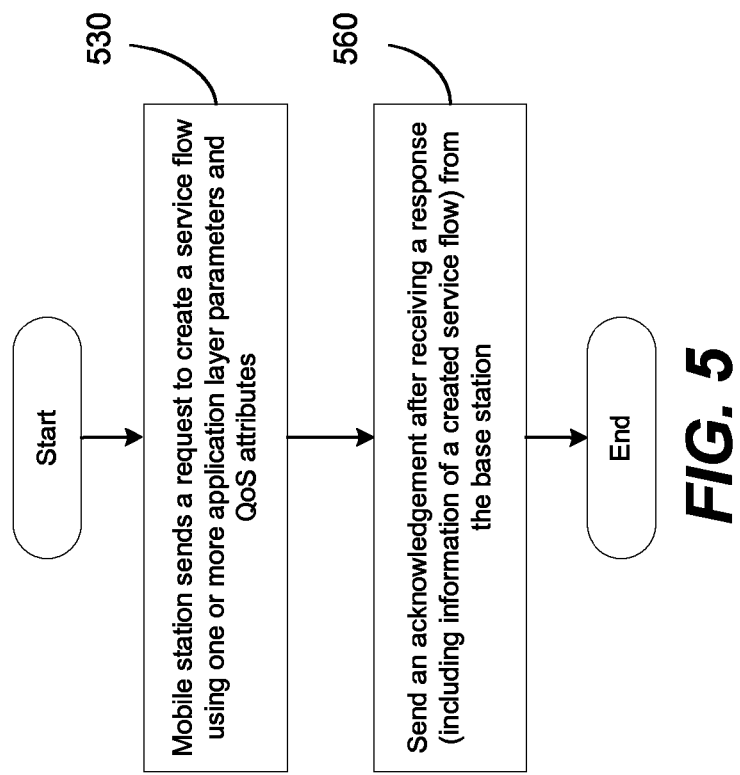

SIGNALING TECHNIQUES FOR A MULTIMEDIA-AWARE RADIO AND NETWORK ADAPTATION

BACKGROUND

Wireless communication technology has evolved to deliver rich multimedia and video services in addition to the traditional voice and data services. Typical wireless multimedia communications involve the transmission of a continuous source over a noisy channel. Common examples are speech communications, mobile TV, mobile video and broadcast streaming. In such communications, the multimedia source is encoded and compressed into a finite stream of bits, and the bit stream is then communicated over the noisy channel. Source coding is carried out to convert the continuous source into a finite stream of bits, and channel coding is performed to mitigate the errors in the bit stream introduced by the noisy channel. Often, it may be necessary to transmit the source over time-varying wireless channels while satisfying certain end-to-end user quality of experience (QoE) constraints, including average distortion and multimedia quality requirements such as in real-time mobile video streaming. Hence, towards the design of enhanced wireless multimedia communication technologies, it may be preferable to optimize the overall user QoE, instead of optimizing more traditional quality of service (QoS) metrics. In general, QoE degradation may be caused by high distortion levels, limited bandwidth, excessive delay, power constraints, and computational complexity limitation. In such a scenario, separating the compression and channel coding may not be optimal any longer from a user QoE perspective.

To ensure optimality in terms of end-to-end QoE, joint source-channel coding (JSCC) techniques may be used to perform source compression and channel coding in a coordinated fashion. In this context, JSCC techniques may jointly optimize codec and radio parameters to minimize end-to-end distortion. JSCC techniques may support cross-layer capabilities, which may provide support for PHY/MAC/NET-aware bit rate adaptation at the codec level to enable source-channel rate matching, e.g., as in adaptive streaming technology widely adopted today in many commercial multimedia delivery systems. Such a cross-layer capability can benefit from signaling techniques that feedback QoE parameters from the client to the server such as real-time control protocol (RTCP), standardized by the Internet Engineering Task Force (IETF) in RFC 3551 specification and also used in both packet-switched streaming (PSS) and multimedia broadcast and multicast services (MBMS) Third Generation Partnership Project (3GPP) specifications (TS 26.234 and TS 26.346, respectively). Such QoE feedback signaling mechanisms may allow streaming service to adapt the bit rate based on varying network conditions (e.g., changing resource availability, time-varying nature of the wireless channel) to ensure higher QoE while maintaining interrupt-free playback. However, the current wireless communication systems such as those specified in Worldwide Interoperability for Microwave Access (WiMAX) and/or Long Term Evolution (LTE) standards do not support cross-layer functionalities required to provide application oriented QoE values for multimedia delivery and enable application-aware PHY/MAC/NET layer adaptation, including application-aware radio resource management and application-aware routing and network control. In particular, in current WiMAX and LTE standards, the network does not pass any content-specific information (e.g., rate-distortion characteristics of the video stream, associated video quality metrics, etc.) regarding the multimedia processing at the codec to the radio access network and core network. Instead, the PHY/MAC/NET layers remain agnostic of application-layer requirements and characteristics and only aim to optimize link quality subject to certain target QoS requirements (e.g., throughput, latency/jitter, packet error/loss rate, etc.).

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 2 is a block diagram of an application-aware end-to-end Quality of Experience (QoE) architecture 200 for multimedia transmission in accordance with an embodiment.

FIG. 5 is a flow-chart 500, which illustrates the signaling techniques performed by the mobile station (MS) or user equipment (UE) while supporting cross-layer functionalities for providing application-oriented QoE for multimedia delivery including the application-aware PHY/MAC/NET adaptation in accordance with an embodiment.

FIG. 6 is a line diagram 600, which illustrates the signals exchanged between the mobile station (MS) or user equipment (UE) while supporting cross-layer functionalities for providing application-oriented QoE for multimedia delivery including the application-aware PHY/MAC/NET adaptation in accordance with an embodiment.

DETAILED DESCRIPTION

Figure 1:
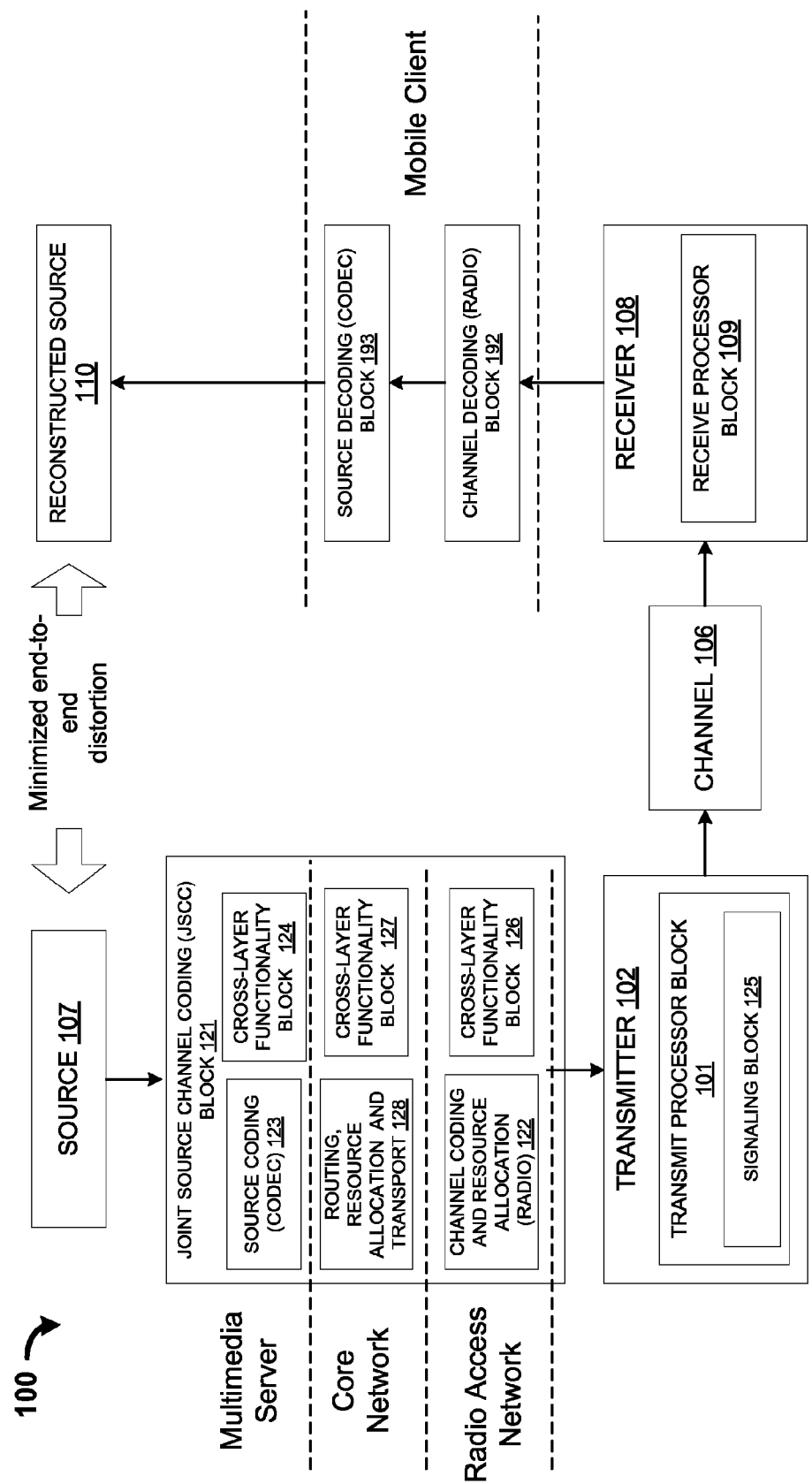
FIG. 1 is a block diagram of a wireless communication system 100, which may use a joint source-channel coding (JSCC) technique in accordance with an embodiment.

The following description describes signaling techniques for multimedia aware radio and network adaptation. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable storage medium may include any mechanism for storing or transmitting information in a form readable by a machine (e.g., a computing device).

For example, a machine-readable storage medium may include read only memory (ROM); random access memory (RAM); magnetic disk storage media; optical storage media; flash memory devices; electrical, optical forms of signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

In one embodiment, the wireless communication systems may support the cross-layer functionalities required to provide application-oriented QoE for multimedia delivery including the application aware PHY/MAC/NET adaptation. In one embodiment, the wireless devices such as a mobile station may enable the higher layers to provide content specific information, related to application layer, to the lower layers, including PHY/MAC/NET layers. In one embodiment, the mobile station may allow the network layer or the transport layer to provide the content specific information (e.g., rate-distortion characteristics of the video stream, associated video quality metrics) related to the multimedia processing at the codec (or the application layer) to the core network and radio access network (PHY/MAC/NET).

In one embodiment, the wireless devices may also support QoS classes/bearers and associated service attributes to include the QoE related metrics on application level multimedia processing. For example, in addition to prioritization of traffic subject to QoS parameters provided by the existing dynamic service association/change (DSx) mechanisms, other information such as multimedia-specific application-layer information or multimedia quality metrics (e.g., peak signal to noise ratio (PSNR) for video) may be exchanged between the client and network to enabling joint source-channel coding (JSCC) based optimizations. In one embodiment, the JSCC based optimization of multimedia transmission may include, for example, distortion-aware resource allocation (or distortion-aware link adaptation) performed at the core network or access network, performed based on the knowledge of application-layer information such as multimedia quality requirements of the users. In one embodiment, the cross-layer functionalities and signaling mechanisms may support exchange of application-level information for QoE aware radio and network adaptation and resource management for one or more service flows. In one embodiment, the content specific information such as application-layer parameters and QoE metrics may also be used to derive mappings between various QoS classes defined to prioritize traffic across different parts of the access network and core network.

In one embodiment, based on the wireless device, which initiates the signaling mechanism for QoS control may be classified as 1) terminal initiated (or MS initiated); and 2) network-initiated (or BS initiated). In one embodiment, in the terminal initiated signaling mechanism, a mobile station (or a client) may request creation of service flows with one or more multimedia specific application-layer parameters and QoE attributes for both the downlink and the uplink traffic. In other embodiment, in the network-initiated signaling mechanism, an application function provided within the base station may generate trigger signals, which may be intended to set-up service flows with one or more multi-media specific application-layer parameters along with the other QoE attributes. In one embodiment, the base station may obtain information multimedia specific application layer parameters using the cross-layer functionalities from the multimedia server using, for example, RTP headers, HTTP headers, IPV4 or IPV6 headers.

As a result of providing content specific information to the lower layers (such as PHY and MAC) and due to signaling mechanism used for QoS control, the user QoE may be enhanced. The end-to-end distortion may be significantly reduced based on using the distortion-aware link adaptation techniques described in detail below. Moreover, for a fixed target user QoE, more users may be supported over the network with fixed capacity resources based on using distortion-aware resource allocation techniques described in detail below.

An embodiment of a block diagram of a communication system 100, which may support cross-layer functionalities required to provide application-oriented QoE for multimedia delivery including the application aware PHY/MAC/NET adaptation in illustrated in FIG. 1. In one embodiment, the communication system 100 may include a source 107, a joint source channel coding (JSCC) block 121, a transmitter 102, a channel 106, a receiver 108, a channel decoding block 192, a source decoding block 193, and a reconstructed source 110.

Typically, source and channel coding operations may be performed at different communication layers and many conventional communication systems may implement the source coding entirely separately from the channel coding. That is, source coding may be performed without taking into account the channel behavior and channel coding may be performed without considering the nature of the source. In general, multimedia wireless communication involves transmitting analog sources over fading channels while satisfying end-to-end distortion and delay requirements of the application. For example, delay-limitedness accounts for the presence of stringent latency and buffer constraints. Accordingly, separation of source and channel coding may not be optimal in general. The sub-optimality of source and channel separation holds particularly when the channel state information (CSI) is not available at the transmitter 102 or when finite coding block lengths are used due to practical system limitations.

In one embodiment, the joint source-channel coding technique may be used to provide distortion-aware link adaptation in wireless systems, for example, toward the selection of modulation and coding parameters in multiple input multiple output (MIMO) systems. In the joint source-channel coding according to implementations herein, the source compression and channel coding may be performed together, such that the end-to-end distortion for wireless multimedia communication may be minimized by accounting for the impact of both quantization errors (due to lossy compression) and channel-induced errors (due to fading and noise).

In one embodiment, the JSCC block 121 may perform joint source-channel coding, in response to receiving a multimedia or information signal from the source 107. In one embodiment, the JSCC block 121 may include a channel coding and resource allocation block 122, a source coding block 123, a routing, resource allocation and transport block 128, a cross-layer functionality block 124 that may accompany the source coding block 123, a cross-layer functionality block 126 that may accompany the channel coding and resource allocation block 122 and a cross-layer functionality block 127 that may accompany the routing, resource allocation and transport block 128. In one embodiment, the source coding block 123 and the cross-layer functionality block 124 may be included in a multimedia server in a content distribution network and the channel coding and resource allocation block 122 and the cross-layer functionality block 126 may be included in a radio access network. In one embodiment, the routing, resource allocation and transport block 128 and the cross-layer functionality block 127 may be included in a core network. In one embodiment, a channel decoding block 192 and a source decoding block 193 may be co-located in a mobile client device receiving content from the multimedia server in the content distribution network. This setup is depicted in FIG. 1.

In other embodiment, it may also be possible that the source coding block 123, the channel coding and resource allocation block 122 and the cross-layer functionality block 124 may belong to the same device, e.g., they may be part of the mobile client device during an uplink wireless transmission from a mobile station or during peer-to-peer wireless communications between two client devices (in which case the routing, resource allocation and transport block 128 and cross-layer functionality blocks 126 and 127 may not be relevant). In one embodiment, the source coding operations may be performed at multimedia servers in the content distribution network, while the channel coding and resource allocation operations may be performed at the radio access network components such as base stations or access network gateways.

In one embodiment, the source coding block 123 (which may use a codec such as H.264 AVC, for example) may perform source coding including compression and/or encoding before providing the compressed signal to a channel coding and resource allocation (which may use radio devices) block 122. The source coding block 123 may be configured to compress or otherwise encode a source 107, such as a multimedia source, to create source-encoded data and pass the source-encoded data along with the content specific information provided by the cross-layer functionality block 124 to the channel coding and resource allocation block 122 in the radio access network through the cross-layer functionality block 126. Furthermore, the source-encoded data along with the content specific information may also be provided by the cross-layer functionality block 124 to the routing, resource allocation and transport block 128 in the core network through the cross-layer functionality block 127. For example, if the source 107 is a stream of video information, the source coding block 123 may encode (e.g., compresses) the received stream of video information into a format suitable (e.g., H.264/MPEG-4 AVC video coding standard developed by the ITU-T Video Coding Experts Group (VCEG) together with the ISO/IEC Moving Picture Experts Group (MPEG), finalized May, 2003, or the like) for transmission. Furthermore, in the case in which the source 107 is an analog stream, source coding block 123 may further convert the analog stream into a digital form (using an analog to digital converter) during encoding.

In one embodiment, the encoding carried out by the source coding block 123 may at least partially depend upon the nature of the multimedia source as well as the compression capabilities of the codec or source encoder. Further, in one embodiment, the cross-layer functionality block 124 may provide the content specific information or facilitate the flow of content specific information from the source coding block 123 to the channel coding and resource allocation block 122 (operating at lower layers) through the cross-layer functionality block 126. Moreover, in one embodiment, the cross-layer functionality block 124 may provide the content specific information or facilitate the flow of content specific information from the source coding block 123 to the routing, resource allocation and transport block 128 (operating at lower layers) through the cross-layer functionality block 127. In one embodiment, the content specific information may include the application oriented QoE for multimedia delivery to be used for application aware link adaptation, resource allocation, routing and network control at the radio access network and core network. In one embodiment, if the cross-layer functionality block 124 is operating in facilitating mode, the content specific information may be used by the source coding block 123 while generating the encoded source.

In one embodiment, as a result of the cross-layer functionalities provided by the cross-layer functionality blocks 124, and 126, the content specific information (i.e., application oriented QoE information for enhancing multimedia delivery using techniques such as application aware link adaptation and resource allocation) included in the encoded source may be passed to the channel coding and resource allocation block 122 and the block 122 may take the content specific information into account for providing the application oriented QoE to channel coding and radio resource allocation process during the channel encoding of the source-encoded data. For example, the content specific information may be provided based on the multimedia application, and passed to the channel coding and resource allocation block 122 from the source coding block 123. In one embodiment, the content specific information may be dependent on application and network layer functionalities, such as frame type (e.g., I-frame, P-frame or B-frame), network layer packetization and transmission framework used toward passing the compressed source from the codec to the channel encoder (e.g., in RTP/UDP/IP or HTTP/TCP/IP), type of layering in the case of advanced source compression methods such as scalable video coding (SVC) and application-layer forward error correction FEC (e.g., raptor codes, Reed-Solomon codes, etc.).

In one embodiment, in addition, the application-layer parameters (or the content specific information) may also be included in the QoS class definitions in the air, access network, and core network interfaces. In one embodiment, the QoS class definitions may be included in the QoS service classes/bearers, which may be exchanged between the access network and the mobile station MS (or user equipment UE)

and in the QoS service classes at the core network level, which may also be negotiated with the MS. In one embodiment, the cross-layer functionalities and the signaling mechanisms may be applicable to both downlink and the uplink communications for the unicast, multicast, and broadcast based multimedia services.

In one embodiment, the channel coding and resource allocation block 122 may perform frequency forward error correction (FEC) coding, interleaving, followed by a MIMO space-time (ST) modulation block, which may then be followed by a MIMO precoding to produce channel-encoded data. Following pre-coding, the channel-encoded data may be transmitted by multi-antenna transmission to the receiver 108 over the MIMO channel 106. In one embodiment, the output bits generated after FEC coding and interleaving may be first modulated to generate symbols using, for example, quadrature amplitude modulation (QAM), and may then be re-encoded using a space-time code (STC) into multiple spatial streams. Alternatively, the coded/interleaved bits after FEC coding and interleaving may be de-multiplexed into multiple spatial streams and each stream may then be modulated to generate symbols using QAM. In one embodiment, the channel coding and resource allocation block 122 may ensure that the link adaptation and resource allocation may be performed based on the application oriented QoE parameter values. In one embodiment, the joint source-channel encoded signal may be provided to the transmitter 102.

In one embodiment, the transmitter 102 may include a transmit processor block 101, which in turn may include a signaling block 125. In one embodiment, the transmit processor block 101 may perform various processing tasks including the signaling tasks to prepare the source-channel encoded signal for transmission over the air interface. In one embodiment, the signaling block 125 may generate or support signals to make the application-layer parameters available in air, access, and core network interfaces. In one embodiment, the signaling block 125 may generate and handle dynamic service association/change (DSx) signals such as request (REQ), response (RSP), and acknowledge (ACK). In one embodiment, the signaling block 125 may support dynamic service association (DSA) mechanism to create new service flows using (DSA-REQ/RSP/ACK messages). In one embodiment, the DSA mechanism may include one or more multimedia specific application level parameters along with other QoE attributes or parameters. In one embodiment, the signaling block 125 may support dynamic service change (DSC) mechanism to modify the parameters of an existing service flow using (DSC-REQ/RSP/ACK messages). In one embodiment, the DSC mechanism may include one or more multimedia specific application level parameters along with other updates of QoE attributes or parameters. In one embodiment, the multimedia specific application level parameters may be used for QoE aware scheduling and resource management over the radio access network and core network. In one embodiment, the multimedia specific application level parameters may also be passed to the core network and radio access network by the client for establishing QoE awareness in the access and core networks, for example, via the resource reservation protocol (RSVP) (to be discussed later in more detail) using DiffServ or IntServ mechanisms as specified by IETF in RFC 2205, or via packet data protocol (PDP) context signaling when dealing with radio access network QoS classes, as specified by 3GPP TS 23.207.

In one embodiment, the transmitter 102 may transmit the modulated data signal and the control signals over the channel 106. In one embodiment, the transmitter 102 may transmit over multiple input multiple output (MIMO) channels to the receiver 108. In one embodiment, the transmitter 102 or receiver 108 may use the application-oriented QoE parameters provided in the signals to create service flows. In one embodiment, the transmitter 102 may use distortion-minimizing or application QoE-optimizing link adaptation parameters during channel encoding and may then transmit the encoded source over the MIMO channel to the receiver 108. In one embodiment, the transmitter 102 may receive a feedback distortion-minimizing link adaptation parameters or application QoE optimizing link adaptation parameters during channel encoding and may then transmit the source signal over the MIMO channel 106 to the receiver 108.

In one embodiment, the receiver 108 may process the encoded signal in response to receiving the encoded signal from the channel 106. In one embodiment, the receive processor block 109 may perform processing tasks such as radio frequency (RF) receive function, frequency synthesis, and filtering, for example. In one embodiment, the receiver 108 may provide the processed signal to the channel decoding block 192. In one embodiment, the channel decoding block 192 may detect and correct bit errors or packet errors. In one embodiment, the decoded bitstreams or packets may be provided to the source decoding block 193. In one embodiment, the source decoding block 193 may generate a reconstructed source 110. In one embodiment, the source decoding operations and channel decoding operations may be performed at the mobile client device, as depicted in FIG. 1. In other embodiment, the source decoding operations may be performed at multimedia servers in the content distribution network, while the channel decoding operations may be performed at the radio access network components such as base stations or access network gateways. In one embodiment, the joint source channel coding operations may span multiple networks and devices and may need appropriate cross-layer functionalities enabled across the multiple networks and devices.

An embodiment of an application-aware end-to-end QoE architecture 200 for multimedia transmission for client-initiated QoS control and network-initiated QoS control is illustrated in FIG. 2. In one embodiment, the application-aware end-to-end QoE architecture 200 may include a multimedia server 210, which may perform source coding and codec-level processing, an IP core network 208, and a wireless network or radio access network 205, which may perform the channel coding and radio-level processing. In one embodiment, the multimedia server 210 may be coupled to the IP core network 208 via a public network 220 such as public switching telephone network (PSTN). In one embodiment, in addition, the IP network 208 may include air interface, access network 260, and core network 240. In one embodiment, the application-aware link adaptation, resource allocation, routing and network control enabled by cross-layer signaling techniques disclosed herein may be used in the core network and access network architecture. In one embodiment, the core network 240 may include data link layer and network layer technologies such as SONET, DWDM, ATM, and IP. In one embodiment, the access network 260 may be coupled to a base station or an enhanced node B (eNB) 270 provided in the wireless network 205. In addition, the wireless network 205 may include a client such as a mobile station (MS) or user equipment (UE) 290.

In one embodiment, the air interface (coupling the access network 260 to the base station 270) may define a set of QoS classes or bearers (e.g., unsolicited grant service, real-time polling service (rtPS), extended rtPS (ertPS, non real-time polling service (nrtPS), and best effort for IEEE® 802.16e standard) and may specify associated attributes in terms of various performance requirements such as throughput, latency/jitter, packet-error loss rate. In one embodiment, the QoS classes/bearers enable a differentiation of the service flows between client applications and services. In one embodiment, each service flow may be mapped to a specific QoS class and may each service flow may prioritized based on the QoS class while the resources may be distributed between the different service flows through scheduling functions.

In one embodiment, the QoS definitions in the IP-based access network 260 and core network 240 may include Differentiated Services (DiffServ) and Integrated Services (IntServ). The IntServ may follow the flow-based and signaled QoS model in which the mobile station 290 may signal the QoS requirements to the base station 270. The DiffServ may follow the provisioned-QoS model, which may prioritize multiple classes of traffic with varying QoS requirements. The DiffServ may use Differentiated Services Code Point (DSCP) field in the header of IP packets for packet classification and IntServ may use Resource Reservation Protocol (RSVP) to reserve the desired QoS for each flow. In order to provide multi-layer QoS control and manage end-to-end QoS, a convergence sub-layer may be used to interface with the higher layer protocol data units, which may perform classification and mapping function. For example, in one embodiment, the convergence sub-layer may be used to derive mappings between QoS classes for the core network 240 and QoS classes for the radio access network 260. In other embodiment, the derivation of QoS classes for the core network 240 and the access network 260 may be based on application-layer parameters and QoE metrics retrieved from RTP, HTTP, IPv4, or IPv6 packet headers. In yet another embodiment, the mapping may be performed at the mobile station 290 (or the client device) to derive target QoS parameters for the communication over the access network 260 and the core network 240 based on application-layer parameters and QoE metrics retrieved from the multimedia server via RTSP, SIP and SDP signaling protocols. In one embodiment, the derived QoS parameters may then be signaled by the mobile station 290 to the core network and access network by various mechanisms, including DSx signaling, resource reservation protocol (RSVP) and packet data protocol (PDP) context signaling (to be discussed later in more detail).

In one embodiment, the base station 270 and/or the MS 290 may support cross-layer functionalities and signaling techniques, described above, to allow application layer parameters to be accessible in the interfaces of air, access network 260, and core network 240. In one embodiment, the BS 270 and/or MS 290 may also support inclusion of the application layer parameters in the QoS class definitions in the interfaces of air, access network 260, and core network 240. In one embodiment, the multimedia specific application layer parameters may include one or more of the following parameters:

rate distortion function for multimedia stream;
other QoE or multimedia quality metrics specified at different rates, reference, reduced-reference or non-reference metrics e.g., video quality metrics (VQM), structural similarity matrix (SSIM), perceptual evaluation of video quality metric (PEVQ), video mean opinion scores (MOS) and other subjective quality metrics;
multimedia codec type (e.g., AMR, MPEG4, H.264 AVC/SVC etc.)
frame type (e.g., intra-coded picture frame (I-frame), predictive coded picture frame (P-frame), and bi-directionally predictive coded picture frame B-frame);
quantization parameters for different frames e.g., varying quantization scales for I, P, and B frames;
layer type in case of scalable video coding (SVC) e.g., base layer, enhancement layer, etc;
multimedia encoder frame rate;
number of Group of picture (GOP) frames i.e., GOP size;
APP-level FEC, erasure coding or network coding parameters;
type of applications e.g., video conferencing, uplink/downlink real-time video streaming, video downloading/uploading, etc.
application-level constraints e.g., delay, jitter, and quality In one embodiment, the inclusion of the parameters listed above in the QoS classes of interfaces of air, access network 260, and the core network 240 may allow service flow differentiation for packets with multimedia content. For example, (1) scalable video coding (SVC) encoded packets including a base layer may be given higher priority and such encoded packets may be delivered reliably compared to packets including an enhancement layer; (2) packets with poor rate-distortion characteristics may be prioritized over packets with better rate-distortion characteristics; (3) packets including an I-frame may be given higher priority and may be delivered reliably compared to packets including P or B-frames.

In one embodiment, based on the wireless device 290 or 270, which initiates the signaling mechanism for QoS control may be classified as 1) terminal initiated (or MS 290 initiated); and 2) network-initiated (or BS 270 initiated). In one embodiment, in the terminal initiated signaling mechanism, the mobile station (or a client) 290 may request (REQ indicated as DSA-REQ in label 202) for creation of service flows with one or more multimedia specific application-layer parameters and QoS attributes for both the downlink and the uplink traffic. In one embodiment, the mobile station 290 may request/initiate (REQ) a signal (initiation signal) to set-up a dedicated service flow with multimedia specific application layer parameters and the initiation signal may be sent to the base station (or eNB) 270. In one embodiment, the base station 270 may send a trigger signal to the access network 260 and the trigger signal may be carried over a QoS application programming interface (API). In one embodiment, the base station 270 may send a response (indicated as DSA-RSP in label 202) after creation of the dedicated service flow based on the application layer specific parameters. In one embodiment, the mobile station 290 may acknowledge (indicated as DSA-ACK in label 202) the receipt of a response (RSP) from the base station 270. In addition to generating the initiation signal, the mobile station 290 may also provide or negotiate application layer parameters such as codec types, codec rates, multimedia quality parameters, and such other values) to or with the base station 270 using application-layer signaling protocols such as session initiation protocol (SIP) or real-time streaming protocol (RTSP) as indicated by label 201 in FIG. 2 (SIP specified by IETF in RFC 3261 and RTSP specified by IETF in RFC 2326). In conjunction with SIP and RTSP, the session description protocol (SDP) may be used to determine the standard representations of the video-specific application-layer information, as specified by IETF in RFC 4566. In one embodiment, the multimedia specific application level parameters may also be passed to the core network and access network by the mobile station 290 for establishing QoE awareness in the access and core networks, for example, via the resource reservation protocol (RSVP) using DiffServ or IntServ mechanisms, or via packet data protocol (PDP) context signaling when dealing with radio access network QoS classes as indicated by label 299.

In other embodiment, in the network-initiated signaling mechanism, an application function provided within the base station 270 may generate trigger signals, which may be intended to set-up service flows with one or more multi-media specific application-layer parameters along with the other QoE attributes. As in terminal initiated signaling mechanism, the mobile station 290 may also provide or negotiate application layer parameters such as codec types, codec rates, multimedia quality parameters and such other values) to the base station 270 using application-layer signaling protocols such as session initiation protocol (SIP) or real-time streaming protocol (RTSP) or SDP as indicated in the label 295. In one embodiment, the base station 270 may obtain multimedia specific application-layer parameters using the cross-layer functionalities from the multimedia server 210 using, for example, RTP headers, HTTP headers, IPV4 or IPV6 headers as indicated in the label 296. In one embodiment, the application-layer parameters may be used to establish QoE awareness over the access network 260 and the core network 240, for example, through DIffServ or IntServ mechanisms. In one embodiment, the network may utilize feedback from mobile station 290 on multimedia specific application-layer parameters (e.g., QoE in the sense of perceived multimedia quality such as measured distortion or measured PSNR for video or subjective quality metrics) based on RTCP or Temporary Maximum Media Stream Bit Rate Request (TMMBR) protocols, as specified by IETF in RFC 3550 and RFC 3551, and as indicated by the label 298.

In one embodiment, the base station 270 may send a request (indicated by DSA-REQ in label 297) to the mobile station 290 and may receive a response (indicated by DSA-RSP in label 297) from the mobile station 290. In one embodiment, the base station 270 may send an acknowledgement (indicated by DSA-ACK in label 297) to the mobile station 290. In one embodiment, the base station 270 may also, optionally, send such multimedia specific application-layer parameters to the mobile station 290 through a downlink traffic using the REQ-RSP-ACK signaling mechanism. In one embodiment, the application-layer parameters may be used to facilitate QoE-aware scheduling and resource allocation decisions at the base station 270 and to enable the mobile stations 290 to provide feedback on QoE-aware channel quality indicator (CQI). In one embodiment, the feedback from the mobile station 290 may be used to further improve the QoE provided to the user. In one embodiment, the operation of the DSC mechanism to pass multimedia specific application layer parameters via REQ-RSP-ACK signaling mechanisms may be similar to DSA mechanism described above.

Figure 3:
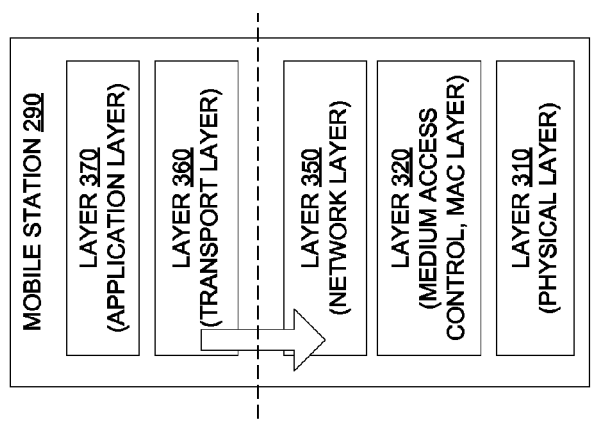
FIG. 3 is a block diagram of a layered representation 300 of a mobile station, which may support cross-layer functionalities for providing application-oriented QoE for multimedia delivery including the application-aware PHY/MAC/NET adaptation in accordance with an embodiment.

An embodiment of a layered representation 300 of the MS 290, which may support cross-layer functionalities for providing application-oriented QoE for multimedia delivery including the application-aware PHY/MAC/NET adaptation is illustrated in FIG. 3. In one embodiment, the layered representation 300 may include higher layers 360 and 370, which may represent transport layer and application layer, for example. In one embodiment, the arrow 390 may indicate that the higher layers such as the application layer 370 and the transport layer 360 may provide the content specific information (application-oriented QoE for multimedia delivery) to the lower layers such as PHY/MAC/NET layers. In one embodiment, the application layer parameters may also be included in the QoS class definitions.

Figure 4:
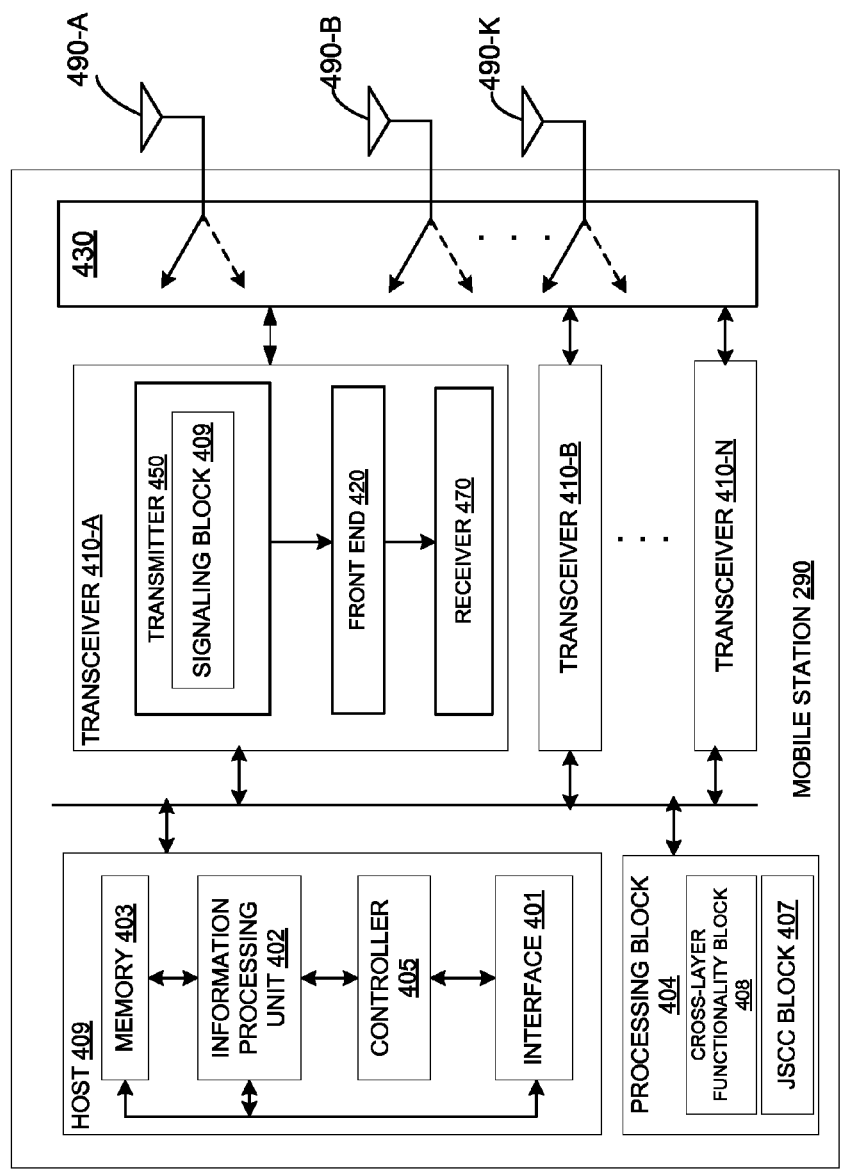
FIG. 4 is a block diagram of a mobile station 400, which may support cross-layer functionalities for providing application-oriented QoE for multimedia delivery including the application-aware PHY/MAC/NET adaptation in accordance with an embodiment.

An embodiment of the MS 290, which may support cross-layer functionalities for providing application-oriented QoE for multimedia delivery including the application-aware PHY/MAC/NET adaptation, is illustrated in FIG. 4. In one embodiment, the MS 290 may include a host 409, a processing block 404, one or more transceivers 410, a switch 430, and one or more antennas 490.

In one embodiment, the host 409 may further include an interface 401, an information processing unit 402, a memory 403, and a controller 405. In one embodiment, the MS 290 may also include one or more transceivers 410-A to 410-N, a switch 430, and multiple antennas 490-A to 490-K. In one embodiment, the MS 290 may be represent or may be included in a computer platform, a laptop computer, a mobile internet device, handhelds, smart phones, and televisions.

In one embodiment, the interface 401 may couple the communication portion (comprising the transceivers 410, switch 430, and the antennas 490) of the MS 290 to the host 409. In one embodiment, the interface 401 may provide physical, electrical, and protocol interface between the communication portion of the MS 290 and the other blocks within the host 409. In one embodiment, the controller 405 may control the modulation and demodulation techniques selected by the transceivers 410. In one embodiment, the controller 405 may control communication parameters such as the transmission rate, bit error rate, and other such parameters. In one embodiment, the host 409 may receive information units from the communication portion of the MS 290 and may also generate information units, which may be provided to the communication portion of the MS 290.

In one embodiment, the switch 430 may couple a transmitter of the transmitters 410 to the antenna 490 on time sharing basis, for example. In one embodiment, the switch 430 may couple a specific transceiver 410 to the antenna 490 in response to an event such as a selection control signal of the controller 405. In other embodiment, the switch 430 may be provided with intelligence to couple an appropriate transmitter 410 to the antenna 490. In one embodiment, the switch 430 may couple the antenna 490 to the transmitter 450 while the transmitter 450 may be ready to transmit signals out to a receiver in other system. In one embodiment, the switch 430 may couple the antenna 490 to the receiver 470, while the antenna 490 has generated signals to be provided to the receiver 470. In one embodiment, the antenna 490 may be coupled to a switch 430.

In one embodiment, the processing block 404 may receive one or more information units such as multimedia data and perform functions such as encoding and modulation. In one embodiment, as described above, the JSCC block 407 may perform joint source and channel coding. In one embodiment, the cross-layer functionality block 408 may provide the content specific information, which may represent the application oriented QoE for multimedia delivery including application aware link adaptation and resource allocation and such content specific information may be used while generating the encoded source.

In one embodiment, as a result of the cross-layer functionalities provided by the cross-layer functionality block 408, the content specific information (i.e., application oriented QoE for multimedia delivery including application aware link adaptation and resource allocation) included in the encoded source may also be passed to the JSCC block 407 to be taken into account for providing the application oriented QoE during the channel encoding of the source-encoded data. For example, the content specific information may be provided based on the multimedia application, and passed to the JSCC block 407. In one embodiment, the signaling block 409 may generate or support signals to make the application-layer parameters available in the interfaces of air, access network 260, and the core network 240. In one embodiment, the signaling block 409 may generate and handle dynamic service association/change (DSx) signals such as request (REQ), response (RSP), and acknowledge (ACK) as described above.

In one embodiment, the transceiver 410-A may comprise a front end 420, a transmitter 450, and a receiver 470. In one embodiment, each of the transceiver 410-B to 410-N may comprise a transmitter and receiver similar to the transmitter 450 and the receiver 470 of the transmitter 410-A. In one embodiment, the transmitter 450 may receive the channel coded signal from the pre-processing block 404 and send the channel coded signal to the front end block 420. In one embodiment, the transmitter 450 may include a signaling block 409 to perform DSA and DSC signaling described above. In one embodiment, the front end block 420 may exchange signals between the antennas 490, the transmitter 450 and the receiver 470. In one embodiment, the front end block 420 may prepare the modulated signal for wireless transmission. In turn, the modulated signal may be transmitted wirelessly via one of the antennas 490. Also, while receiving signals from the antennas 490, the front end block 420 may prepare wireless signals received via one of the antennas 490. In one embodiment, the front end block 420 may include amplifiers, filters, up-converters, down-converters, and such other components.

In one embodiment, the receiver 470 may perform various functions such as analog to digital conversion of the received signal, demodulation on the received digital signal, and estimation of signal quality values. The demodulation may be performed using techniques such as Fast Fourier Transforms (FFTs). The demodulated signal so produced may be further processed by the processing block 404 to generate a channel decoded signal and a source decoded signal, which may include one or more symbols and the symbols may be further processed (e.g., de-interleaving, FEC decoding, and/or de-randomizing) before sending an information unit to the host module 409.

An embodiment of an operation of the mobile station 290 that may perform signaling techniques while supporting cross-layer functionalities for providing application-oriented QoE for multimedia delivery including the application-aware PHY/MAC/NET adaptation is illustrated in flow-chart of FIG. 5.

In block 530, the mobile station 290 may send a request (DSA-REQ 610) as indicated in line diagram 600 of FIG. 6 to create a service flow using one or more application-layer specific parameters and QoE attributes. In one embodiment, the mobile station 290 may generate an initiation signal to set-up a dedicated service flow with multimedia specific application layer parameters and the initiation signal (DSA-REQ 610) may be sent to a base station (or eNB) 270. In addition to generating the initiation signal, the mobile station may also provide or negotiate application layer parameters such as codec types, codec rates, and such other values) to the base station using application-layer signaling protocols such as session initiation protocol (SIP) or real-time streaming protocol (RTSP).

In block 560, the mobile station 290 may send an acknowledgement (DSA-ACK 680) in response to receiving a response signal (DSA-RSP 640) from the base station 270. In one embodiment, the base station may send the response (DSA-RSP 640) after creating a dedicate service flow based on the on the application-layer specific parameters and QoE parameters included in the signal DSA-REQ 610 received from the mobile station 290 in block 530. In one embodiment, the base station 270 may send a trigger signal to the access network 260 and the trigger signal may be carried over a QoS application programming interface (API).

Figure 7:
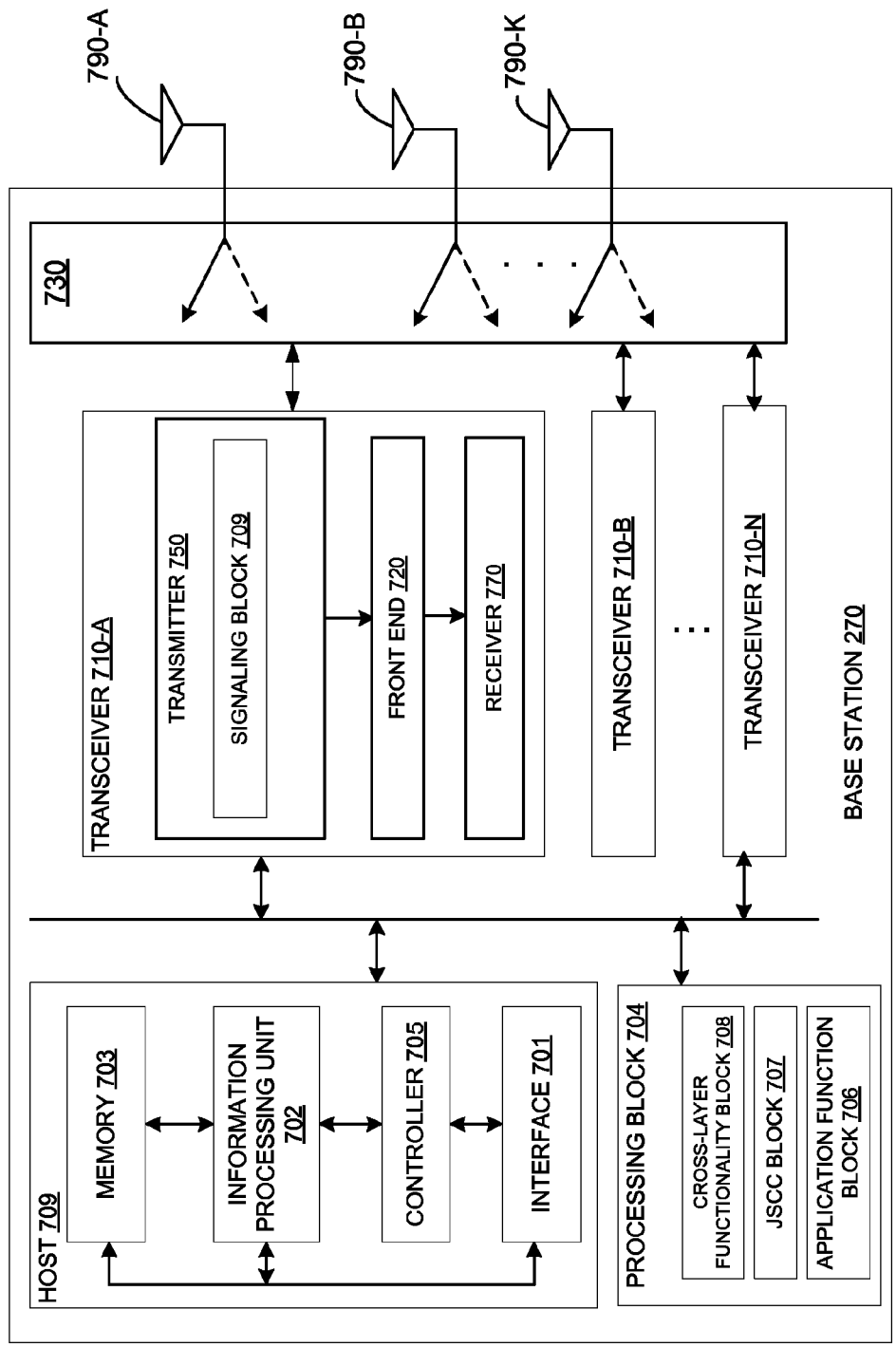
FIG. 7 is a block diagram 700 of a base station (or enhanced node B or eNB), which may support cross-layer functionalities for providing application-oriented QoE for multimedia delivery including the application-aware PHY/MAC/NET adaptation in accordance with an embodiment.

An embodiment of the base station 270, which may support cross-layer functionalities for providing application-oriented QoE for multimedia delivery including the application-aware PHY/MAC/NET adaptation is illustrated in FIG. 7. In one embodiment, the block diagram of the base station 270 may be similar to that of the mobile station 290 and the functionality of at least some of the blocks may be similar and such blocks are not described herein to maintain brevity. Only the differences between the block diagrams of FIG. 4 and FIG. 7 are described below.

In one embodiment, while performing network initiated signaling mechanism, the application function block 706 provided within the transmitter 750 may generate trigger signals, which may be intended to set-up service flows with one or more multi-media specific application-layer parameters along with the other QoE attributes. In one embodiment, the trigger signals may be used to collect/negotiate the application layer parameters such as codec types, codec rates, and such other values) and such information may be collected using application-layer signaling protocols such as session initiation protocol (SIP) or real-time streaming protocol (RTSP).

Figure 8:
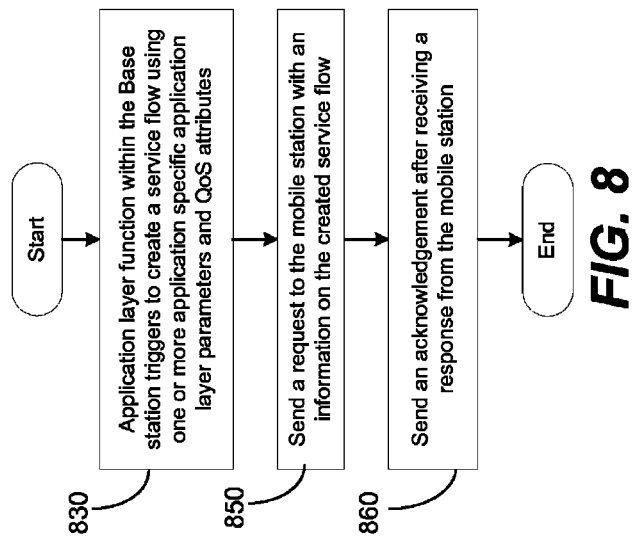
FIG. 8 is a flow-chart 800, which illustrates the signaling techniques performed by the base station (BS or eNB) while supporting cross-layer functionalities for providing application-oriented QoE for multimedia delivery including the application-aware PHY/MAC/NET adaptation in accordance with an embodiment.

An embodiment of an operation of the base station 270 that may perform signaling techniques while supporting cross-layer functionalities for providing application-oriented QoE for multimedia delivery including the application-aware PHY/MAC/NET adaptation is illustrated in flow-chart of FIG. 8.

Figure 9:
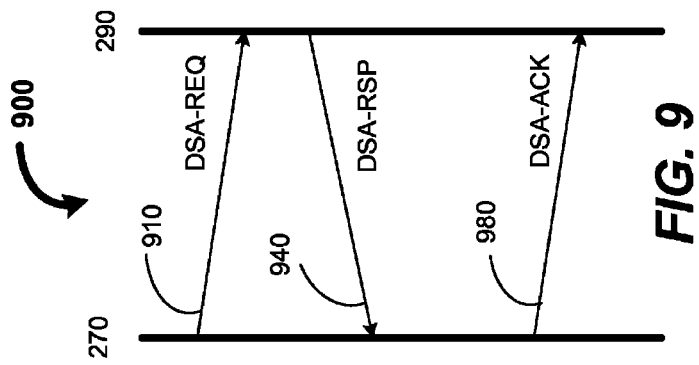
FIG. 9 is a line diagram 900, which illustrates the signals exchanged between the base station (BS or eNB) and MS while supporting cross-layer functionalities for providing application-oriented QoE for multimedia delivery including the application-aware PHY/MAC/NET adaptation in accordance with an embodiment.

In block 830, the application function block 706 within the base station 270 may send a request (DSA-REQ 910) as indicated in line diagram 900 of FIG. 9 to create a service flow using one or more application-layer specific parameters and QoE attributes. In one embodiment, the application block 706 may generate trigger signals, which may be intended to set-up service flows with one or more multi-media specific application-layer parameters along with the other QoE attributes. In one embodiment, the application-layer parameters may be used to establish QoE awareness over the access network 260 and core network 240, for example, through DIffServ or IntServ mechanisms.

In block 850, the signaling block 709 within the base station 270 may send a request (DSA-REQ 910 depicted in line diagram 900 of FIG. 9) to the mobile station 290. In one embodiment, the DSA-REQ 910 may include indicators to inform the mobile station 290 that service flows based on the application-layer specific attributes (or parameters) and QoE attributes are created.

In block 860, the signaling block 709 may send an acknowledgement (DSA-ACK 980) in response to receiving a response signal (DSA-RSP 940) from the mobile station 290.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method to enhance quality of experience (QoE) in a wireless communication system, comprising:
   receiving, at a base station (BS) in a WiMax network, a dynamic service addition request (DSA-REQ) and one or more multimedia-specific application layer parameters, the DSA-REQ comprising a request to create a WiMax service flow for transmission of multimedia content to a mobile station (MS);
   transmitting a trigger signal to create the WiMax service flow based on the one or more multimedia-specific application layer parameters, the WiMax service flow comprising a quality of service (QoS) class defined for the WiMax network, the WiMax service flow prioritized based on the QoS class;
transmitting a dynamic service addition response (DSA-RSP) to the MS;
receiving a source-encoded signal comprising the multimedia content;
generating a source-channel encoded signal using the source-encoded signal and the one or more multimedia-specific application layer parameters; and
transmitting the source-channel encoded signal to the MS via the WiMax service flow.

2. The method of claim 1, comprising providing the one or more multimedia-specific application layer parameters to one or more of a network layer, a medium access control layer, and a physical layer.

3. The method of claim 1, wherein the one or more multimedia-specific application layer parameters comprise one or more of a rate distortion function parameters, QoE metrics, multimedia codec type, source encoding and decoding capability, multimedia quality metrics, multimedia coding and layering parameters, frame type, frame rate, quantization parameters, quantity of group of pictures, and application-level constraints.

4. The method of claim 1, comprising modifying one or more parameters of an existing WiMax service flow based on the one or more multimedia-specific application layer parameters.

5. The method of claim 1, further comprising using a joint source-channel coding technique to generate the source-channel encoded signal.

6. An article, comprising a non-transitory machine-readable storage medium storing instructions that, when executed by a processor, cause a mobile station (MS) in a WiMax network to:
transmit a dynamic service addition request (DSA-REQ) and one or more multimedia-specific application layer parameters, the DSA-REQ comprising a request to create a WiMax service flow for transmission of multimedia content to the MS, the WiMax service flow comprising a (QoS) class defined for the WiMax network, the WiMax service flow prioritized based on the QoS class, the QoS class determined based on the one or more multimedia-specific application layer parameters;
receive a dynamic service addition response (DSA-RSP) in response to the DSA-REQ; and
receive a source-channel encoded signal comprising the multimedia content via the WiMax service flow.

7. The article of claim 6, wherein the one or more multimedia-specific application layer parameters comprise one or more of a rate distortion function parameters, QoE metrics, multimedia codec type, source encoding and decoding capability, multimedia quality metrics, multimedia coding and layering parameters, frame type, frame rate, quantization parameters, quantity of group of pictures, and application-level constraints.

8. The article of claim 6, the machine-readable medium storing instructions that, when executed by the processor, cause the MS to transmit a DSA-REQ comprising a request to modify one or more parameters of an existing WiMax service flow based on the one or more multimedia-specific application layer parameters.

9. The article of claim 6, the source-channel encoded signal generated using a joint source-channel coding technique.

10. An article, comprising a non-transitory machine-readable storage medium storing instructions that, when executed by a processor, cause a base station (BS) in a WiMax network to:
receive a dynamic service addition request (DSA-REQ) and one or more multimedia-specific application layer parameters, the DSA-REQ comprising a request to create a WiMax service flow for transmission of multimedia content to a mobile station (MS);
transmit a trigger signal to create the WiMax service flow based on the one or more multimedia-specific application layer parameters, the WiMax service flow comprising a quality of service (QoS) class defined for the WiMax network, the WiMax service flow prioritized based on the QoS class;
transmit a dynamic service addition response (DSA-RSP) to the MS;
receive a source-encoded signal comprising the multimedia content;
generate a source-channel encoded signal using the source-encoded signal and the one or more multimedia-specific application layer parameters; and
transmit the source-channel encoded signal to the MS via the WiMax service flow.

11. The article of claim 10, the machine-readable medium storing instructions that, when executed by the processor, cause the BS to provide the one or more multimedia-specific application layer parameters to one or more of a network layer, a medium access control layer, and a physical layer.

12. The article of claim 10, wherein the one or more multimedia-specific application layer parameters comprise one or more of a rate distortion function parameters, QoE metrics, multimedia codec type, source encoding and decoding capability, multimedia quality metrics, multimedia coding and layering parameters, frame type, frame rate, quantization parameters, quantity of group of pictures, and application-level constraints.

13. The article of claim 10, the machine-readable medium storing instructions that, when executed by the processor, cause the BS to transmit a trigger signal to modify one or more parameters of an existing WiMax service flow based on the one or more multimedia-specific application layer parameters.

14. The article of claim 10, the machine-readable medium storing instructions that, when executed by the processor, cause the BS to use a joint source-channel coding technique to generate the source-channel encoded signal.

\* \* \* \* \*